(12) United States Patent
Chen et al.

(10) Patent No.: US 8,949,177 B2
(45) Date of Patent: Feb. 3, 2015

(54) METHOD FOR CHARACTERIZING SYSTEM STATE USING MESSAGE LOGS

(75) Inventors: Chuanwen Chen, Highland Park, NJ (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 663 days.

(21) Appl. No.: 12/542,466

(22) Filed: Aug. 17, 2009

(65) Prior Publication Data

US 2010/0290601 A1 Nov. 18, 2010

Related U.S. Application Data

(60) Provisional application No. 61/178,239, filed on May 14, 2009.

(51) Int. Cl.
*G06F 17/30* (2006.01)
*H04M 3/22* (2006.01)
*H04L 12/24* (2006.01)

(52) U.S. Cl.
CPC ......... *H04M 3/2218* (2013.01); *H04L 41/0677* (2013.01); *H04L 41/16* (2013.01)
USPC ...................................................... 707/609

(58) Field of Classification Search
None
See application file for complete search history.

(56) References Cited

U.S. PATENT DOCUMENTS

| | | | | |
|---|---|---|---|---|
| 5,682,488 A | * | 10/1997 | Gleason et al. | 715/833 |
| 7,225,183 B2 | * | 5/2007 | Gardner | 1/1 |
| 7,472,095 B2 | * | 12/2008 | Huelsbergen et al. | 706/20 |
| 7,567,960 B2 | * | 7/2009 | Wei et al. | 1/1 |
| 7,689,610 B2 | | 3/2010 | Bansal et al. | |
| 7,788,536 B1 | | 8/2010 | Qureshi et al. | |
| 2005/0038888 A1 | | 2/2005 | Labertz | |
| 2005/0114508 A1 | | 5/2005 | DeStefano | |
| 2006/0064177 A1 | * | 3/2006 | Tian et al. | 700/1 |
| 2007/0088972 A1 | | 4/2007 | Srivastava et al. | |
| 2007/0192308 A1 | * | 8/2007 | Wei et al. | 707/5 |
| 2007/0283194 A1 | | 12/2007 | Villella et al. | |
| 2008/0104062 A1 | | 5/2008 | Oliver et al. | |
| 2008/0130645 A1 | * | 6/2008 | Deshpande et al. | 370/392 |
| 2008/0134209 A1 | | 6/2008 | Bansal et al. | |
| 2008/0294651 A1 | * | 11/2008 | Masuyama et al. | 707/100 |
| 2008/0319940 A1 | * | 12/2008 | Garg et al. | 707/2 |

OTHER PUBLICATIONS

Fernandez Rivas, Omar F., "U.S. Appl. No. 11/874,161 Office Action Sep. 30, 2010", , Publisher: USPTO, Published in: US.
Mat-Hassan et al, "Associating Search and Navigation Behavior Through Log Analysis", "Journal of the American Society for Information Science and Technology", Apr. 25, 2005, pp. 913-934, Publisher: 2005 Wiley Periodicals, Inc., Wiley Interscience, http://www.interscience.wiley.com, Published in: US.

(Continued)

*Primary Examiner* — Jay Morrison
(74) *Attorney, Agent, or Firm* — Maldjian Law Group LLC; John Maldjian; Alexander D. Walter

(57) ABSTRACT

A method that enables the run-time behavior of a system to be analyzed is disclosed. By analyzing the totality of the messages in the log or logs system behavior can be better understood. The illustrative embodiment of the present invention detects patterns in message logs, clusters similar messages, and determines system behavior based on the clustering of messages.

23 Claims, 8 Drawing Sheets

(56) References Cited

OTHER PUBLICATIONS

Yamanishi et al., "Dynamic Syslog Mining for Network Failure Monitoring", Aug. 21-24, 2005, Publisher: KDD '05, Chicago, Illinois USA, Published in: US.

Levy et al., "Early Warning of Failures Through Alarm Analysis—A Case Study in Telecom Voice Mail Systems", "IEEE International Symposium on Software Reliability Engineering (ISSRE 2003) Denver, CO", Nov. 17-20, 2003, Publisher: IEEE, Published in: US.

Lee et al., "Error/Failure Analysis Using Event Logs from Fault Tolerant Systems", 1991, Publisher: IEEE, Published in: US.

Facca et al., "Mining Interesting Knowledge from Weblogs; a Survey", "http://www.sciencedirect.com Data & Knowledge Engineering xxx(2004)xxx-xxx", 2004, Publisher: Elsevier B.V.

"Levenshtein distance", "http://en.wikipedia.org/w/index.php?title=Levenshtein_distance&printabl", Mar. 23, 2009, Publisher: Wikimedia Foundation, Inc., Published in: US.

"e-Handbook of Statistical Methods", "NIST SEMATECH http://www.itl.nist.gov/div898/handbook/index.htm", Dec. 3, 2010, Publisher: National Institute of Standards and Technology (NIST) US Commerce Department.

Chair of Statistics, Univeristy of Wurzburg, "A First Course on Time Series Analysis—Examples with SAS", Sep. 1, 2006, Publisher: Michael Falk.

"Introduction to Time Series Analysis", "NIST Engineering Statistics Handbook http://www.itl.nist.gov/div898/handbook/pmc/section4/pmc4.htm", Dec. 3, 2010, Publisher: NIST.

"Response time (definition)", "ATIS Telectom Glossary 2007", Dec. 13, 2010, Publisher: Alliance for Telecommunications Industry Solutions (ATIS) Committee PRQC.

"Response time (definition)", "http://www.its.bldrdoc.gov/fs-1037/dir-031/_4584.htm", Dec. 13, 2010.

"Response time (technology)", "Wikipedia http://en.wikipedia.org/wiki/Response_time_technology)", Dec. 3, 2010, Publisher: Wikimedia Foundation, Inc.

National Communications System Technology & Standards Division, "Telecommunications: Glossary of Telecommunication Terms", "Federal Standard 1037C http://www.its.bldrdoc.gov/fs-1037/dir-040/_5957.htm", Aug. 7, 1996, Publisher: General Services Administration Information Technology Service.

Fernandez Rivas, Omar F., "U.S. Appl. No. 11/874,161 Office Action Jan. 27, 2011", , Publisher: USPTO, Published in: US.

\* cited by examiner

Telecommunications System 100

Figure 3    Telecommunications System 100

METHOD FOR CHARACTERIZING SYSTEM STATE USING MESSAGE LOGS

CROSS REFERENCE TO RELATED APPLICATIONS

This application claims the benefit of U.S. Provisional Application No. 61/178239, filed May 14, 2009, which is incorporated by reference.

The following case is incorporated herein by reference: U.S. patent application Ser. No. 11/874,161, filed Oct. 17, 2007.

If there are any contradictions or inconsistencies in language between this application and the case that has been incorporated by reference that might affect the interpretation of the claims in this case, the claims in this case should be interpreted to be consistent with the language in this case.

FIELD OF THE INVENTION

The present invention relates to telecommunications in general, and, more particularly, to analyzing message logs.

BACKGROUND OF THE INVENTION

Almost all telecommunications systems, such as telecommunication system 100, are programmed to generate message logs. The messages that are written into the message logs report on a wide variety of phenomena, such as communication initiation and termination, the success or failure of a call, and so forth.

The data-processing systems that generate the message logs often comprise large, complex software systems with millions of lines of instructions that have evolved over many years of development. Examples of such data-processing systems in a telecommunications context are routers, switches, servers, and so forth. In turn, each data-processing system is often part of a larger system such as a telecommunications system. It is important to understand the system behavior of these data-processing systems, in order to maintain or improve their reliability—particularly with respect to a failure condition, in which a hardware or software component of the telecommunications network fails to perform as intended.

These message logs do not easily lend themselves to automated analysis, because of the volume of messages that can be generated. For example, consider that in an enterprise Voice over Internet Protocol (VOIP) environment, a data-processing system that provides the call control can generate a million status messages or more per hour.

What is needed is a technique for leveraging message logs in order to understand and characterize the behavior of a processing system, specifically with respect to the failure behavior of the system, without some of the disadvantages in the prior art.

SUMMARY OF THE INVENTION

The present invention enables the run-time behavior of a system to be analyzed. By analyzing the totality of the messages in the log or logs system behavior can be better understood. The illustrative embodiment of the present invention detects patterns in message logs, clusters similar messages, and determines system behavior based on the clustering of messages.

While the basic concept of the present invention might seem straightforward, it is in fact complex because of the huge variety and number of status messages that can be generated in a relatively short period of time. For example, a telecommunications system, such as that of the illustrative embodiment of the present invention in an enterprise voice over Internet Protocol (VOIP) environment, can generate over a million status messages per hour as part of the message logs. Additionally, there can be over 100,000 distinct messages contained in those message logs.

To overcome the problem of complexity, the messages in the message log are classified so that patterns can be seen to emerge from the message log as a whole. Applying the method of the illustrative embodiment of the present invention to the log files can be used to ascertain a "signature" of the system state and its transitions, especially in large complex software systems.

The method of the illustrative embodiment of the present invention features the analysis of unstructured logs. However, it will be clear to those skilled in the art, after reading this disclosure, how to make and use alternative embodiments of the present invention that are able to analyze structured logs. Furthermore, while exemplifying the understanding of failure behavior in a telecommunications system, the illustrative embodiment of the present invention is also applicable to understanding behavior in other types of systems and to mapping other types of behavior, for example and without limitation, those related to intrusions, frauds, anomalies, etc., and those related to complex systems, for example and without limitation, financial markets, electronic communications networks, electronic trading platforms, demographic tracking, tracking groups of objects, etc.

The illustrative embodiment of the present invention comprises: compiling a message log, retrieving individual messages, dividing the messages into their components, and performing a statistical process to determine the dis-similarity between the message components. Messages with a low dis-similarity distance are clustered together, and a second message log is produced. This process is repeated, making a third message log. From this series of message logs, the system state can be determined.

DETAILED DESCRIPTION

Figure 1:
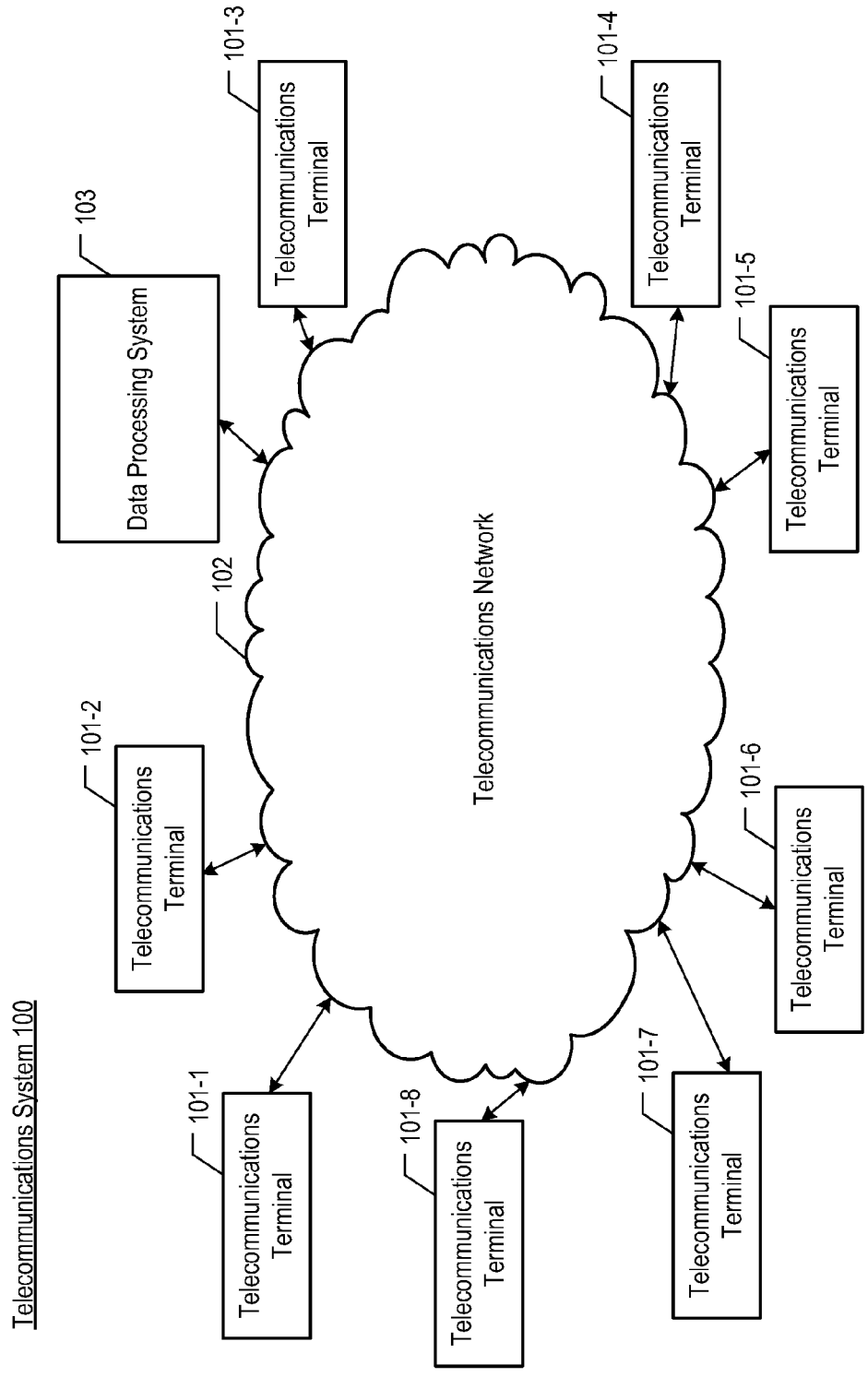
FIG. 1 depicts a schematic diagram of a portion of telecommunications system 100 in accordance with the illustrative embodiment of the present invention.

FIG. 1 depicts a schematic diagram of a portion of telecommunications system 100 in accordance with the illustrative embodiment of the present invention. Telecommunications system 100 comprises telecommunications terminals 101-1 through 101-8, telecommunications network 102, and data processing system 103.

Although telecommunications network comprises eight (8) telecommunications terminals, it will be clear to one skilled in the art, after reading this disclosure how to make and use alternative embodiments of the present invention in which there are any number of telecommunications terminals.

Although telecommunications network comprises one telecommunications network, it will be clear to one skilled in the art, after reading this disclosure how to make and use alternative embodiments of the present invention in which there are any number of telecommunications networks.

Although telecommunications network comprises one data processing center, it will be clear to one skilled in the art, after reading this disclosure how to make and use alternative embodiments of the present invention in which there are any number of data processing centers.

Telecommunications terminal 101-1 through 101-8 are hardware and software for communicating on a telecommunications network. In accordance with the illustrative embodiment of the present invention, telecommunications terminals 101-1, through 101-8 can be either wireline terminals or wireless terminals, or a combination of both.

Telecommunications network 102 is a private network, but it will be clear to those skilled in the art, after reading this disclosure, how to make and use alternative embodiments of the present invention in which telecommunication network 102 is another network, for example and without limitation, the Public Switched Telephone Network, the Internet, a private data network, a private branch exchange, a satellite network, etc.

Data processing system 103 is hardware and software for coordinating communication with between the telecommunications terminals and the telecommunications network. It will be clear to one skilled in the art, after reading this disclosure how to make and use data processing system 103.

Figure 2:
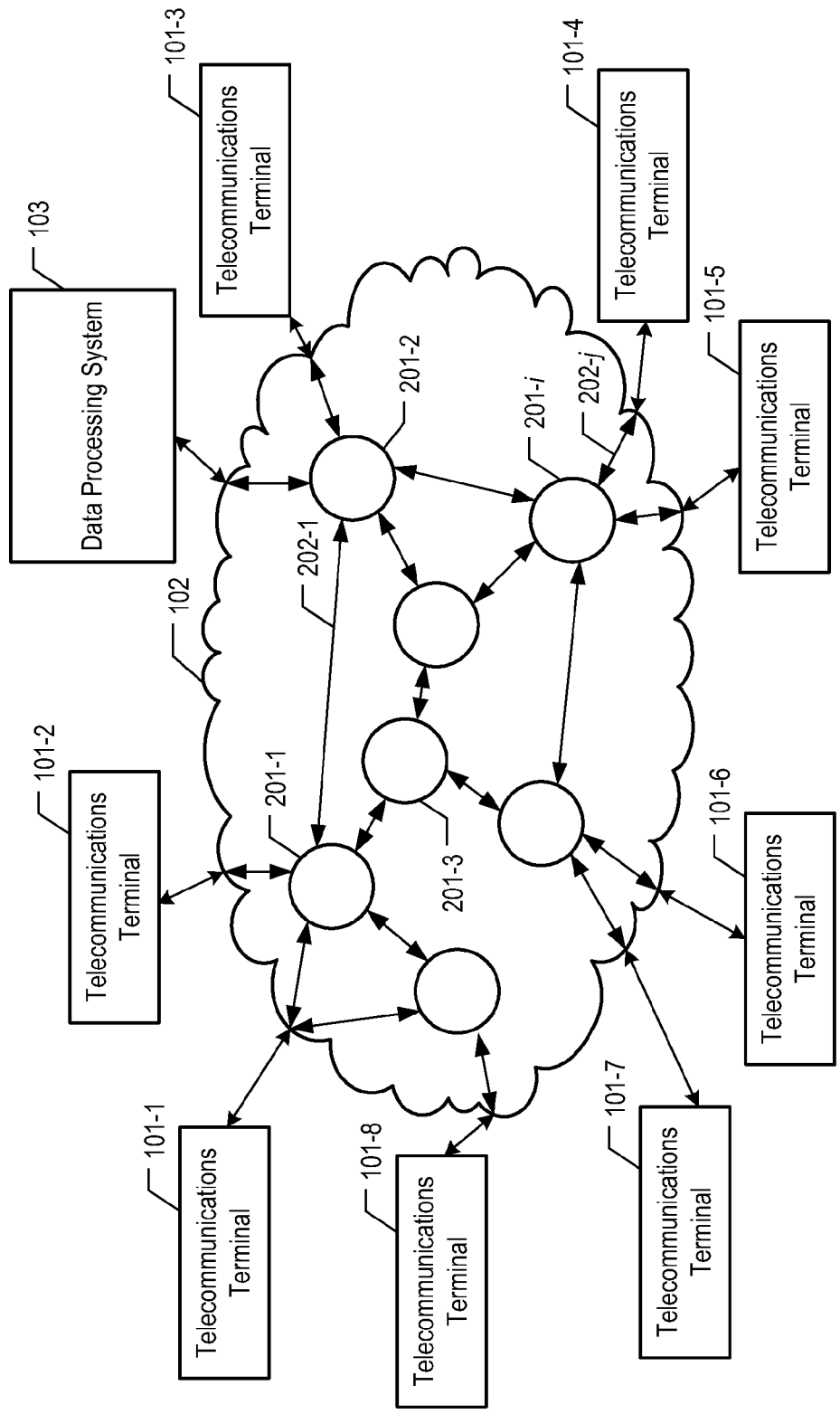
FIG. 2 depicts a schematic diagram of a portion of telecommunications system 100 in accordance with the illustrative embodiment of the present invention.

FIG. 2 depicts a schematic diagram of a portion of telecommunications system 100 in accordance with the illustrative embodiment of the present invention. Telecommunications system 100 comprises telecommunications terminals 101-1 through 101-8, telecommunications network 102, data processing system 103, communication node 201-1 through 201-i where i can be between 1 and I, and communication link 202-1 through 202-j where j can be between 1 and J.

Although telecommunications network comprises seven (7) communication nodes, it will be clear to one skilled in the art, after reading this disclosure how to make and use alternative embodiments of the present invention in which there are any number of communication nodes.

Although telecommunications network comprises nineteen (19) communication links, it will be clear to one skilled in the art, after reading this disclosure how to make and use alternative embodiments of the present invention in which there are any number of communication links.

Telecommunications network 102 comprises a plurality of nodes and their physical interconnections, arranged in the topology shown. It will be clear to those skilled in the art, however, after reading this specification, how to make and use alternative embodiments of the present invention with networks that comprise any number of nodes and have any topology.

Each node in telecommunications network 102 is capable of receiving a packet and of forwarding that packet to another node, in well-known fashion, based on the destination address in the packet. For example, when node 201-1 receives a packet from source node telecommunications terminal 201-1, which packet contains node telecommunications terminal 101-3 as its destination address, node 201-1 must decide which of its adjacent nodes to forward the packet to.

Each node 201-i in telecommunications network 102 decides which adjacent node to give each packet to based on: (1) the destination address in the packet, and (2) a routing table in the node. Table 1 depicts a routing table for node 201-1 in accordance with the illustrative embodiment of the present invention.

TABLE 1

| Illustrative Routing Table For Node 201-1 | | |
|---|---|---|
| Destination node Address | Preferred Next Node | First Alternative Next Node |
| 101-3 | 201-2 | 201-3 |
| 101-4 | 201-3 | 201-2 |
| 101-5 | 201-2 | 201-3 |

When all of the resources in the network are functioning and there is little network congestion, each node forwards a packet to the preferred next node listed in the routing table. For example, when node 201-1 receives a packet with the destination address telecommunications terminal 101-3, the preferred next node is node 201-2.

In contrast, when the preferred next node is not functioning or there is congestion at the preferred next node, the routing node can alternatively route the packet to the first alternative next node. For example, the first alternative next node at node 201-1 for a packet with the destination address telecommunications terminal 101-3 is node 201-3.

When all of the resources in a network are functioning and there is little congestion, each node forwards a packet to the node listed as the entry for the preferred next node and the packet progresses from one preferred next node to the next and the next and so on until it reaches its destination node.

Figure 3:
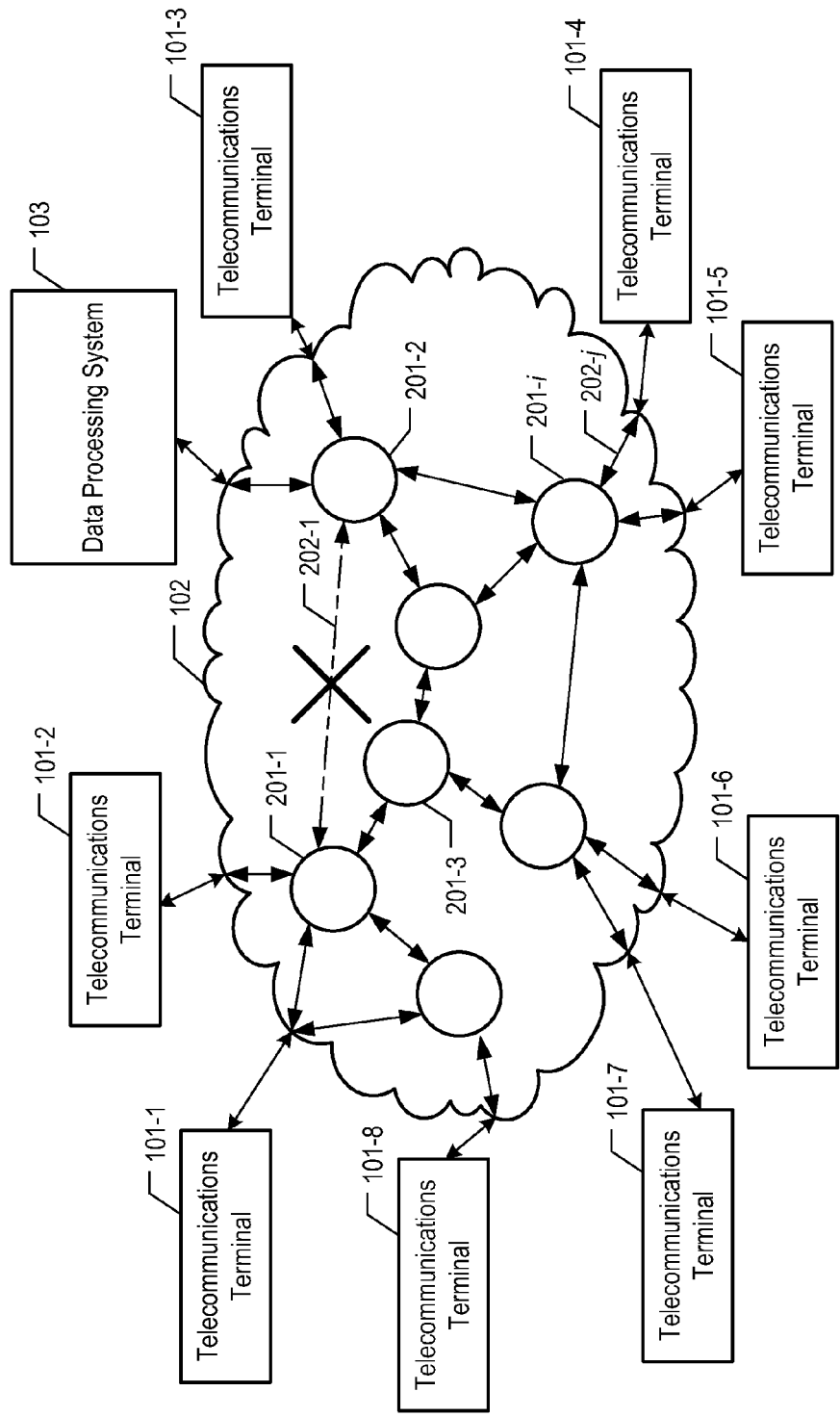
FIG. 3 depicts a schematic diagram of a portion of telecommunications system 100 in accordance with the illustrative embodiment of the present invention.

FIG. 3 depicts a schematic diagram of a portion of telecommunications system 100 in accordance with the illustrative embodiment of the present invention. Telecommunications system 100 comprises telecommunications terminals 101-1 through 101-8, telecommunications network 102, data processing system 103, communication node 201-1 through 201-i where i can be any number between 1 and I inclusive, and communication link 202-1 through 202-j where j can be between 1 and J inclusive.

In accordance with the illustrative embodiment of the present invention, for illustrative purposes, link 202-1 is broken. If a user of telecommunications terminal 101-1 were to initiate a call to a user of telecommunications terminal 101-3, the call would have to go through several communication nodes and several communication links. If link 202-1 were not broken, the call would instead go through that link. In accordance with the illustrative embodiment of the present invention, the data packets sent from telecommunications terminal 101-1 to telecommunications terminal 101-3 would still successfully reach their destination but after several failed attempts and in a way that is less efficient.

However, it is often not clear when and if communications links are broken. There may be many causes for why a link may or may not work and often these signals are not properly understood by systems.

In accordance with the illustrative embodiment of the present invention, data processing system 103 would receive messages regarding the call between telecommunications terminal 101-1 and telecommunications terminal 101-3. However, it would be traveling along a different, less efficient path than it would normally travel. Because calls would be completed, it would be likely that some time may pass before a user or administrator of telecommunications system 100 is aware of a problem at this link.

In accordance with the illustrative embodiment of the present invention, data processing system 103 tracks all the actions of all the communication nodes and communication links. Further in accordance with the illustrative embodiment of the present invention, data processing system 103 keeps track of all calls between the telecommunications terminals.

In accordance with the illustrative embodiment of the present invention, data processing system 103 keeps track of all these communications by keeping a log of signals sent throughout telecommunications system 100. Many of these signals are successful, and the log entries reflect that. However, many of these signals fail, and by tracking these failures, the sources of the failures can be discovered and fixed. This process of keeping a log cannot itself diagnose the problems that affect telecommunications system 100.

Figure 4:
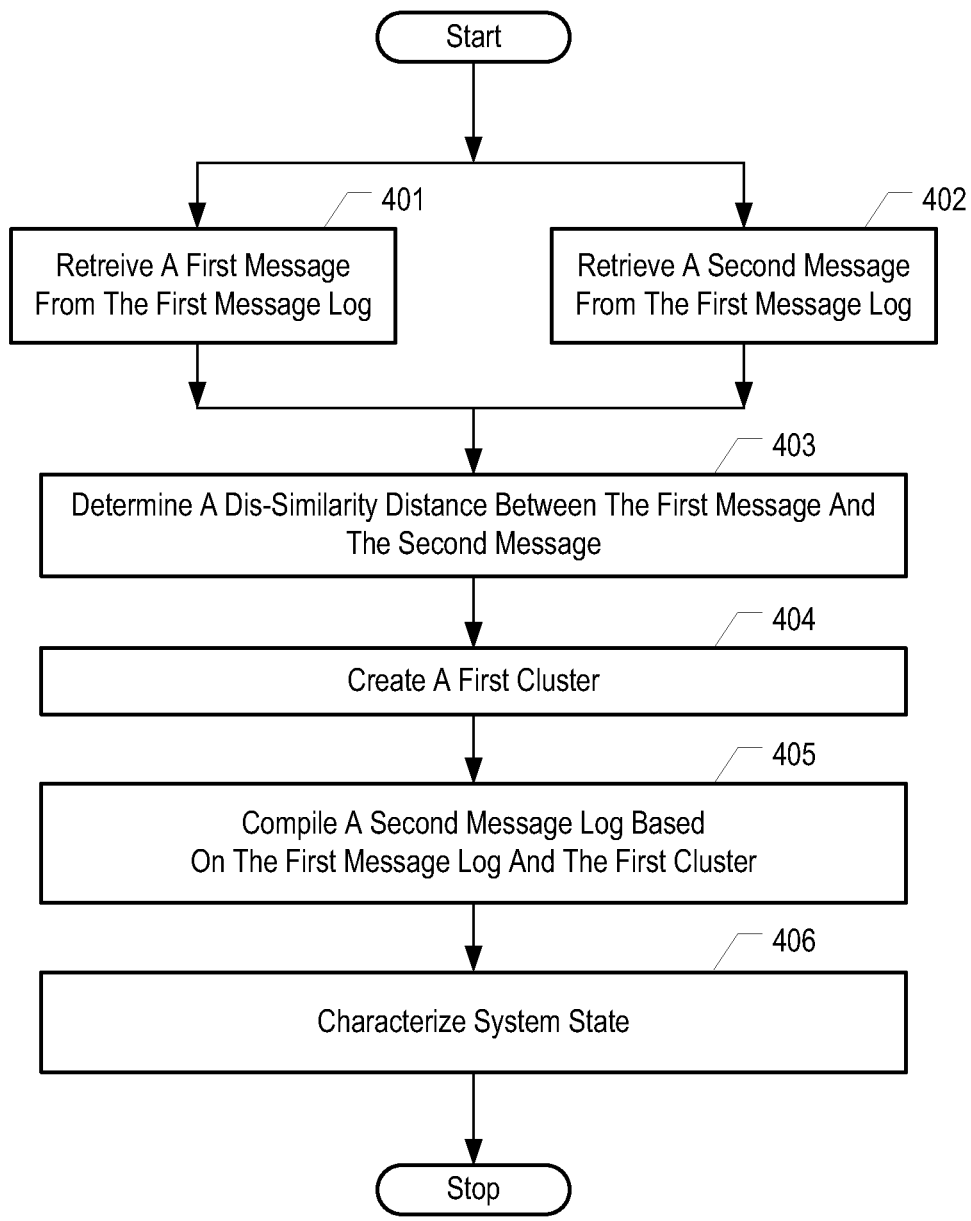
FIG. 4 depicts a flowchart of the salient tasks associated with the operation of the illustrative embodiment of the present invention.

FIG. 4 depicts a flowchart of the salient tasks associated with the operation of the illustrative embodiment of the present invention.

Although, in accordance with the illustrative embodiment of the present invention, tasks 401 through 406 are performed at data processing system 103. However, it will be clear to one skilled in the art, after reading this disclosure how to make and use other implementations of the present invention in which the steps are performed by another device as part of telecommunications system 100 including, but not limited to: a telecommunications terminal or a communications node. It will be clear to one skilled in the art, after reading this disclosure, how to implement the tasks in FIG. 4.

Although, in accordance with the illustrative embodiment of the present invention, FIG. 4 shows how to perform the salient tasks associated with the operation of the illustrative embodiment of the present invention with two (2) messages, it will be clear to one skilled in the art, after reading this disclosure how to implement the present invention for any number of messages. Furthermore, it is the intention that the illustrative embodiment of the present invention be used with a very large number of messages in the first log.

Although, in accordance with the illustrative embodiment of the present invention, tasks 401 and 402 are performed simultaneously, it will be clear to one skilled in the art, after reading this disclosure, how to make and use alternative embodiments of the present invention in which tasks 401 and 401 are performed in any order.

At task 401, a first message is retrieved from the first message log. In accordance with the illustrative embodiment of the present invention, the message log comprises multiple messages. Table 2 is a simplified illustration of a first message log:

TABLE 2

Simplified Illustration of a First Message Log

| # | Message |
|---|---------|
| 1 | Message_1 |
| 2 | Message_2 |
| 3 | Message_3 |
| 4 | Message_4 |
| 5 | Message_5 |
| 6 | Message_6 |

TABLE 2-continued

Simplified Illustration of a First Message Log

| # | Message |
|---|---------|
| 7 | Message_7 |
| 8 | Message_8 |
| 9 | Message_9 |
| 10 | Message_10 |

Although, in accordance with the illustrative embodiment of the present invention, table 2 comprises ten messages, it will be clear to one skilled in the art, after reading this disclosure, how to make and use alternative embodiments of the present invention in which there are any number of entries.

Although, in accordance with the illustrative embodiment of the present invention, table 2 comprises ten different messages, it will be clear to one skilled in the art, after reading this disclosure, how to make and use alternative embodiments of the present invention in which there are repeated messages.

Although, in accordance with the illustrative embodiment of the present invention, table 2 comprises ten messages that are virtually identical, it will be clear to one skilled in the art, after reading this disclosure, how to make and use alternative embodiments of the present invention in which there are greater differences between the messages.

Although, in accordance with the illustrative embodiment of the present invention, table 2 comprises simple, short messages, it will be clear to one skilled in the art, after reading this disclosure, how to make and use alternative embodiments of the present invention in which the messages are of any length and complexity.

In accordance with the illustrative embodiment of the present invention, the messages in a message log are of the following form:

TABLE 3

Illustration of Sample Messages

20060118:032918946:2445:proc1(2548):HIGH:[timRestVar: time thread to sleep]
20060118:033026975:2446:proc2(2249):HIGH:[IntchgReqFail: errcode=1]
20060118:033116820:2451:proc2(2249):MED:[Being told to Go Active!!!]
20060118:033116820:2454:proc2(2249):MED:[standby!active :interchange..]
20060118:033116820:2455:proc2(2249):MED:[State Transition:standby to active]

In accordance with the illustrative embodiment of the present invention, these messages are "unstructured" in that the messages themselves do not follow any necessary pattern.

At task 402, a second message is retrieved from the first message log.

At task 403, a dis-similarity distance between the first message and the second message is determined. This task is discussed in greater detail in FIG. 5.

At task 404, a first cluster of messages is created. This task is discussed in greater detail with regard to FIG. 6.

At task 405, a second message log based on the first message log and the first cluster is compiled. In accordance with the illustrative embodiment of the present invention, the second message log would be comprised of the first cluster and the messages of the first message log that were not clustered. It will be clear to one skilled in the art, after reading this disclosure how to perform task 405.

Table 4 illustrates a simplified second message log based on the clustering in accordance with the illustrative embodiment of the present invention:

TABLE 4

Simplified Illustration of a Second Message Log

| # | Message |
|---|---|
| 1 | Cluster_1 |
| 2 | Cluster_1 |
| 3 | Cluster_1 |
| 4 | Cluster_2 |
| 5 | Cluster_1 |
| 6 | Cluster_2 |
| 7 | Cluster_2 |
| 8 | Cluster_3 |
| 9 | Cluster_4 |
| 10 | Cluster_2 |

Although, in accordance with the illustrative embodiment of the present invention, the second message log comprises four clusters, it will be clear to one skilled in the art, after reading this disclosure, how to make and use alternative embodiments of the present invention in which there are any number of clusters.

Although, in accordance with the illustrative embodiment of the present invention, the second message log comprises only clusters, it will be clear to one skilled in the art, after reading this disclosure, how to make and use alternative embodiments of the present invention in which there are, for example and without limitation, clusters and messages.

Although, in accordance with the illustrative embodiment of the present invention, the second message log is comprised of the cluster data structures, it will be clear to one skilled in the art, after reading this disclosure, how to make and use alternative embodiments of the present invention in which, for example and without limitation, indicia of the clusters are placed in the message log instead.

At task 406, system state is characterized based on a comparison of the second message log and the third message log. In accordance with the illustrative embodiment of the present invention, the second message log and the third message log are compared. In accordance with the illustrative embodiment of the present invention, this is done by determining the differences in clusters and outliers in the second message log from those in the third message log. Then an assessment of the system state is made based on the comparison of the second log and the third log. In accordance with the illustrative embodiment of the present invention, with reference to FIG. 2 and FIG. 3, a cluster of messages would indicate that a number of data packets failed to transmit on link 202-1 (in FIG. 3), and that same cluster of messages would not appear in a message log that reflects FIG. 2. This change would alert the system to a possible failure along link 202-1.

It will be clear to one skilled in the art, after reading this disclosure how to make and use other implementations of the present invention in which one or more of the steps are omitted or are performed in a different order than the one presented or simultaneously.

Figure 5:
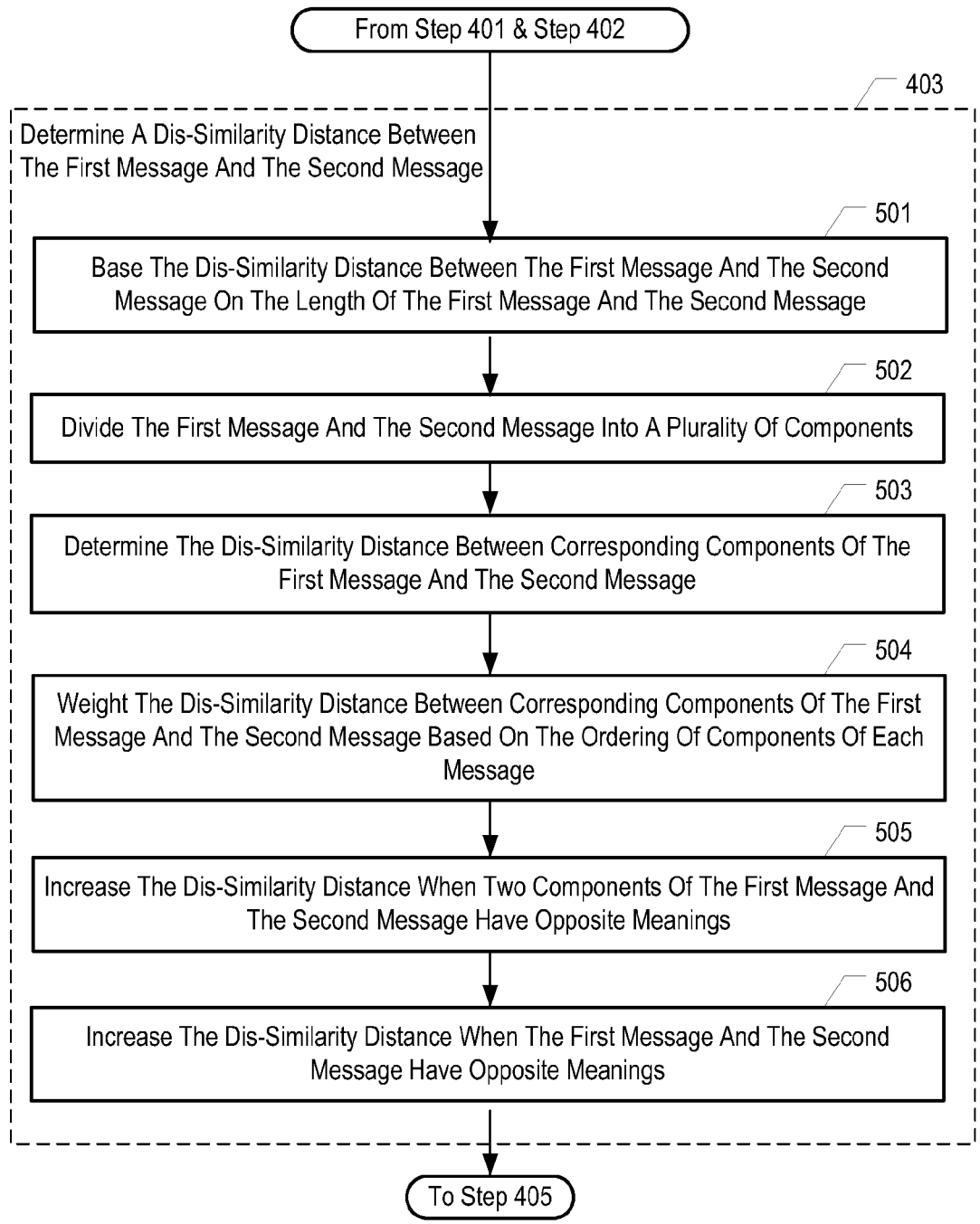
FIG. 5 depicts a flowchart of the salient tasks associated with task 403 in accordance with the illustrative embodiment of the present invention.

FIG. 5 depicts a flowchart of the salient tasks associated with task 403 in accordance with the illustrative embodiment of the present invention. At task 403, the dis-similarity distance between the first message and second message is determined.

Dis-similarity is a concept in statistics that determines how different two strings of letters and numbers are. The greater the dis-similarity distance between two strings, the more dis-similar the two strings are. Consequently, the smaller the dis-similarity distance between two strings, the more similar the two strings are.

Message logs are comprised of a series of messages, and each message is itself a string. These messages are often long and repetitive. Message logs often comprise thousands of messages. In all, it is too large a task for a person to go through these logs and determine the relevant messages.

The illustrative embodiment of the present invention determines the dis-similarity distance between messages in a message log. In accordance with the illustrative embodiment of the present invention, we define the dis-similarity distance as, $\Delta$. Where $\Delta$ is the difference between a first message and a second message, or:

$$\Delta = A - B.$$

In accordance with the illustrative embodiment of the present invention, the dis-similarity distance is determined through a Levenshtein analysis. It will be clear to one skilled in the art, after reading this disclosure, how to make and use alternative embodiments of the present invention that perform task 403 using a different analysis.

In accordance with the illustrative embodiment of the present invention, the equation to get a basic dis-similarity distance is:

$$LR(s_1, s_2) = \frac{L(s_1, s_2)}{\max(\text{length}(s_1), \text{length}(s_2))} \qquad \text{(Eq. 1)}$$

wherein LR is the Levenshtein Ratio between $s_1$ and $S_2$, L is the Levenshtein distance between $s_1$ and $S_2$, and the denominator is the greater of the lengths of $s_1$ and $S_2$.

Although accordance with the illustrative embodiment of the present invention, the Levenshtein distance is performed with the above equation, it will be clear to one skilled in the art, after reading this disclosure how find a dis-similarity distance wherein another equation is substituted in equation 1.

Although accordance with the illustrative embodiment of the present invention, the Levenshtein ratio is performed with the above equation, it will be clear to one skilled in the art, after reading this disclosure how find a dis-similarity distance wherein another equation is substituted in equation 1.

Further, in accordance with the illustrative embodiment of the present invention, the above equation is further modified to correct for zero-length messages.

$$LR'(s_1, s_2) = \frac{a + L(s_1, s_2)}{b + \max(\text{length}(s_1), \text{length}(s_2))} \qquad \text{(Eq. 2)}$$

wherein a and b are terms introduced to prevent problems with 0-length strings. In accordance with the illustrative embodiment of the present invention, the values of a and b in the above equation are very small. For example, and without limitation, these values can be a=0.2, b=0.5. It will be clear to one skilled in the art, after reading this disclosure how to make and use alternative embodiments of the present invention in which different values are used. If both sequences are long, the impact on the dissimilarity measure due to a and b, is negligible and the number is close to the Levenshtein ratio LR in Equation 1.

At task 501, the dis-similarity distance between the first message and the second message is based on the length of the first message and the second message.

As an example, for the two sets (a; ab) versus (who; whoare), we would like the second set to be more similar than the first. Consider a simple situation where the two strings $s_1$ and $S_2$ have the same length. Assume a perfect alignment is just a simple ordered alignment. The probability that there are x common characters is exponentially decreasing as x increases. Based on this observation, we define a factor a that increases exponentially with x.

$$\alpha = e^{\frac{x}{m}} - 1.0 \qquad \text{(Eq. 3a)}$$

wherein e is the mathematical value of that name and wherein m is a constant.

Thus we now have a third equation, the modified Levenshtein ratio (MLR):

$$MLR(s_1,s_2) = \text{Max}(LR'(s_1,s_2)*\alpha, 0) \qquad \text{(Eq. 3b)}$$

Although accordance with the illustrative embodiment of the present invention, the modified Levenshtein ratio is performed with the above equation, it will be clear to one skilled in the art, after reading this disclosure how to perform task 502 wherein another equation is substituted for equation 3. It will be clear to one skilled in the art, after reading this disclosure how to perform task 501.

At task 502, the first message and the second message are divided into a plurality of components. In accordance with the illustrative embodiment of the present invention, the first message and the second message are comprised of a series of component messages. Examples of these components include, for example and without limitation: the origin node, the destination node, link, the success or failure of the transmission, etc. These components of the messages are relevant to the illustrative embodiment of the present invention because these components allow the system to determine, for example and without limitation, where a break down may be occurring, which portions of the system are used more heavily than others, when peak periods of use may occur, etc.

In accordance with the illustrative embodiment of the present invention, the message string is broken into smaller substrings. In accordance with the illustrative embodiment of the present invention, this is performed by taking into account the number of words in a given message. For example, and without limitation, the longer the message, the greater the number of substrings derived from the message string and the greater the number words derived from the message string.

Although, in accordance with the illustrative embodiment of the present invention, this is performed by taking into account the number of words in a message, it will be clear to one skilled in the art, after reading this disclosure, how to make and use alternative embodiments of the present invention in which the metric used is, for example and without limitation, the number of characters in the message.

It will be clear to one skilled in the art, after reading this disclosure, how to perform task 502.

At task 503, the dis-similarity distance between corresponding components of the first message and the second message is determined. In accordance with the illustrative embodiment of the present invention, the corresponding components are compared to get a greater picture of the actual similarity than by just comparing the messages in their entirety. Instead, for example the system compares origin to origin, link to link, etc.

In accordance with the illustrative embodiment of the present invention, the application of a dis-similarity analysis to the message components provides this equation:

$$SWLR(s_1, s_2) = \sum_{j=1}^{k} MLR(s_1^j, s_2^j) \qquad \text{(Eq. 4a)}$$

At task 504, the dis-similarity distance between corresponding components of the first message and the second message is weighted based on the ordering of components of each message. In accordance with the illustrative embodiment of the present invention, certain components of a message are given greater weight based on where in the message they will appear.

It will be clear to one skilled in the art, after reading this disclosure how to make and use alternative embodiments of the present invention in which the weighted components would come later in a message, etc.

$$SWLR(s_1, s_2) = \sum_{j=1}^{k} W_j * MLR(s_1^j, s_2^j) \qquad \text{(Eq. 4b)}$$

At task 505, the dis-similarity distance is increased when two components of the first message and the second message have opposite meanings. In accordance with the illustrative embodiment of the present invention, this would be when there are words which give the components opposite meanings such as, for example and without limitation: not/successfully, connected/failed, etc.

$$MSWLR(s_1, s_2) = \sum_{j=1}^{k} (W_j * MLR(s_1^j, s_2^j) - \beta_j) \qquad \text{(Eq. 5)}$$

wherein $\beta_j$ is defined as follows:

| | | |
|---|---|---|
| $\beta_j$ | = | 0 if sign($s_1^j$) and sign($s_2^j$) are the same |
| | = | 0 if $D_{prev} > d_1$ |
| | = | 0 if $D_{curr} > d_2$ |
| | = | $1 + (d_1 - D_{prev}) + (d_2 - D_{curr})$ |

In accordance with the illustrative embodiment of the present invention, this would be accomplished by means of a series of "dictionaries" in which there would be a series of "positive" words and "negative" words and the message components would be checked against the dictionaries for opposite meanings. It will be clear to one skilled in the art, after reading this disclosure, how to make and use alternative embodiments of the present invention that perform task 505.

At task 506, the dis-similarity distance is increased when the first message and the second message have opposite meanings. It will be clear to one skilled in the art, after reading this disclosure, how to perform task 506.

It will be clear to one skilled in the art, after reading this disclosure how to make and use other implementations of the present invention in which one or more of the steps are omitted or are performed in a different order than the one presented or simultaneously.

Figure 6:
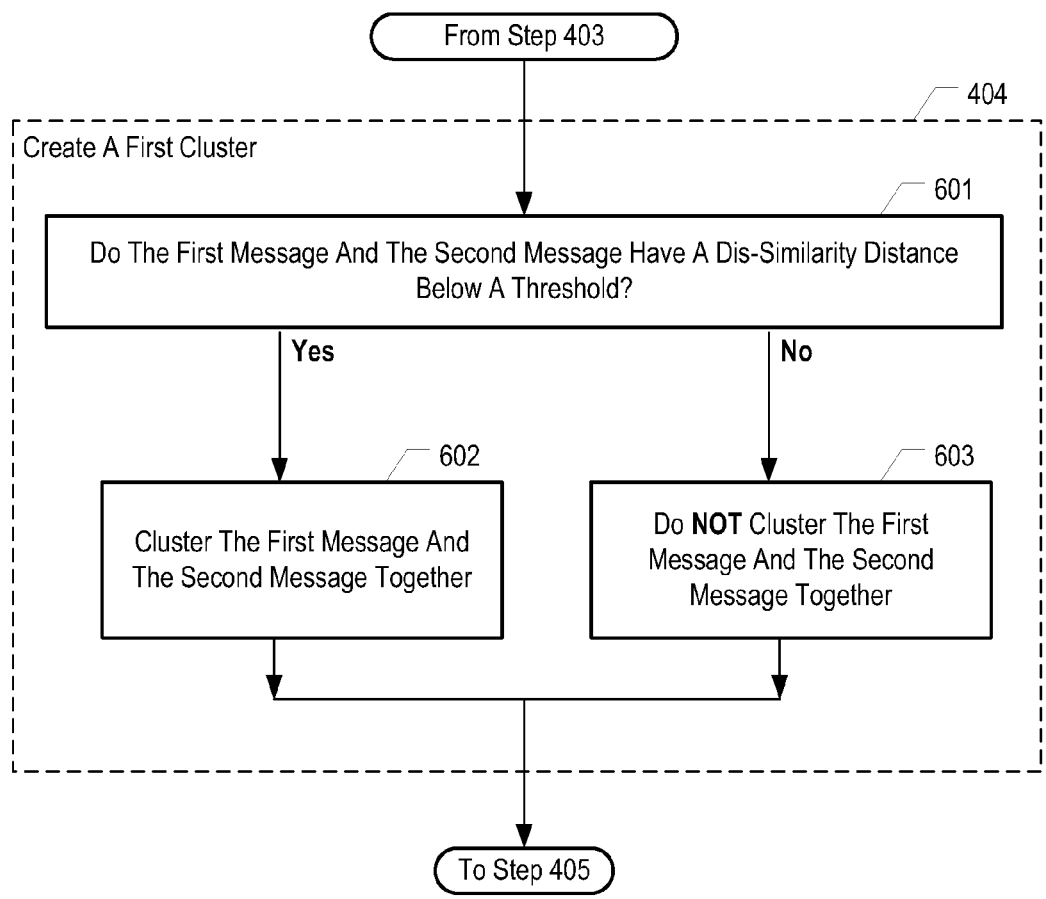
FIG. 6 depicts a flowchart of the salient tasks associated with task 404 in accordance with the illustrative embodiment of the present invention.

FIG. 6 depicts a flowchart of the salient tasks associated with task 404 in accordance with the illustrative embodiment of the present invention.

At task 601, data processing system 103 determines if the dis-similarity distance between the first message and the second message have a dis-similarity distance below a threshold.

At task 602, if the dis-similarity distance is below a threshold, the first message and the second message are clustered together.

In accordance with the illustrative embodiment of the present invention, clustering the messages is accomplished by creating a data structure in which the two messages with a dis-similarity distance below the threshold are placed. Further in accordance with the illustrative embodiment of the present invention, the data structure comprises an indicium of the messages clustered and an indicium of the number of messages clustered.

It will be clear to one skilled in the art, after reading this disclosure how to make and use alternative embodiments of the present invention in which the clustering is performed in a different matter, for example and without limitation: one of the two messages that is selected, an indicium of the messages, an indicium of the messages and the number of messages, etc.

At task 603, if the dis-similarity distance is above a threshold, the first message and the second message are NOT clustered together.

It will be clear to one skilled in the art, after reading this disclosure how to make and use other implementations of the present invention in which one or more of the steps are omitted or are performed in a different order than the one presented or simultaneously.

Figure 7:
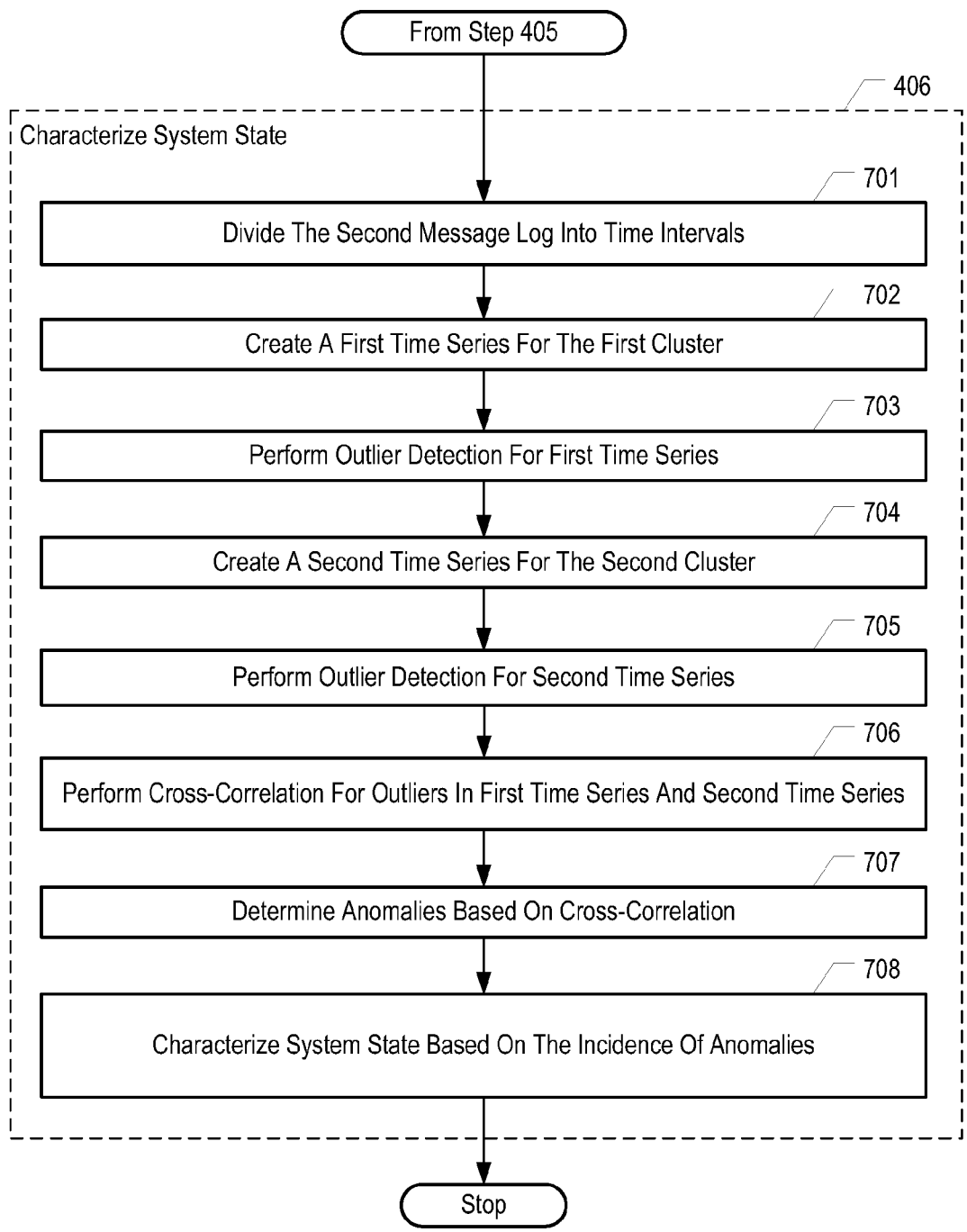
FIG. 7 depicts a flowchart of the salient tasks associated with task 406 in accordance with the illustrative embodiment of the present invention.

FIG. 7 depicts a flowchart of the salient tasks associated with task 406 in accordance with the illustrative embodiment of the present invention.

At task 701, the second message log is divided into time intervals.

Although, in accordance with the illustrative embodiment of the present invention, the time interval would be a period such as five (5) minutes, it will be clear to one skilled in the art, after reading this disclosure, how to make and use alternative embodiments of the present invention in which the time intervals are of any length, for example and without limitation, one hour, one day, five days, one week, one month, etc.

At task 702, a first time series is created for the first cluster.

In accordance with the illustrative embodiment of the present invention, a "time series" is defined as a sequence of data points, spaced in time intervals (such as those created at step 701).

In accordance with the illustrative embodiment of the present invention, the data points are based on the clusters in each time interval.

Although in accordance with the illustrative embodiment of the present invention, time series are used in successive steps in order to give context to the data points, it will be clear to one skilled in the art, after reading this disclosure how to make and use alternative embodiments of the present invention, in which task 702 is performed in a different manner than the one presented.

At task 703, outlier detection is performed on the first time series. In accordance with the illustrative embodiment of the present invention, task 703 is performed by determining the incidence of the first cluster at each time interval in the time series.

In accordance with the illustrative embodiment of the present invention, this is done by a statistical method that averages the number of times a cluster appears in each time interval. Incidences of the first cluster that are a particular number of standard deviations from the mean will be determined to be "outliers."

Although the illustrative embodiment of the present invention, uses a standard deviation model to determine outliers, it will be clear to one skilled in the art, after reading this disclosure, how to make and use alternative embodiments of the present invention in which another method is used, for example and without limitation, when the number of clusters exceeds a particular number.

At task 704, a second time series is created for the second cluster.

At task 705, outlier detection is performed on the second time series.

At task 706, a cross-correlation is performed for outliers in the first time series and the second time series. In accordance with the illustrative embodiment of the present invention, the cross-correlation will determine at which time intervals outliers appeared in the first time series and in the second time series.

Although in accordance with the illustrative embodiment of the present invention, outliers appear in at the same time period, it will be clear to one skilled in the art, after reading this disclosure how to make and use alternative embodiments of the present invention in which outliers instead appear for example and without limitation, at different time periods within a larger time period (such as: anomalies appearing within an hour of one another, within ten minutes of one another, etc.), in the same region of a network, at the same or similar time periods (such as at the same time each day during a week, on weekends, etc.), in the same or approximate geographic area, etc.

At task 707, anomalies are determined based on the cross-correlation. In accordance with the illustrative embodiment of the present invention, if cross-correlated outliers appear in the first time series and the second time series, then it must be determined if there exist anomalies in the system.

Figure 8:
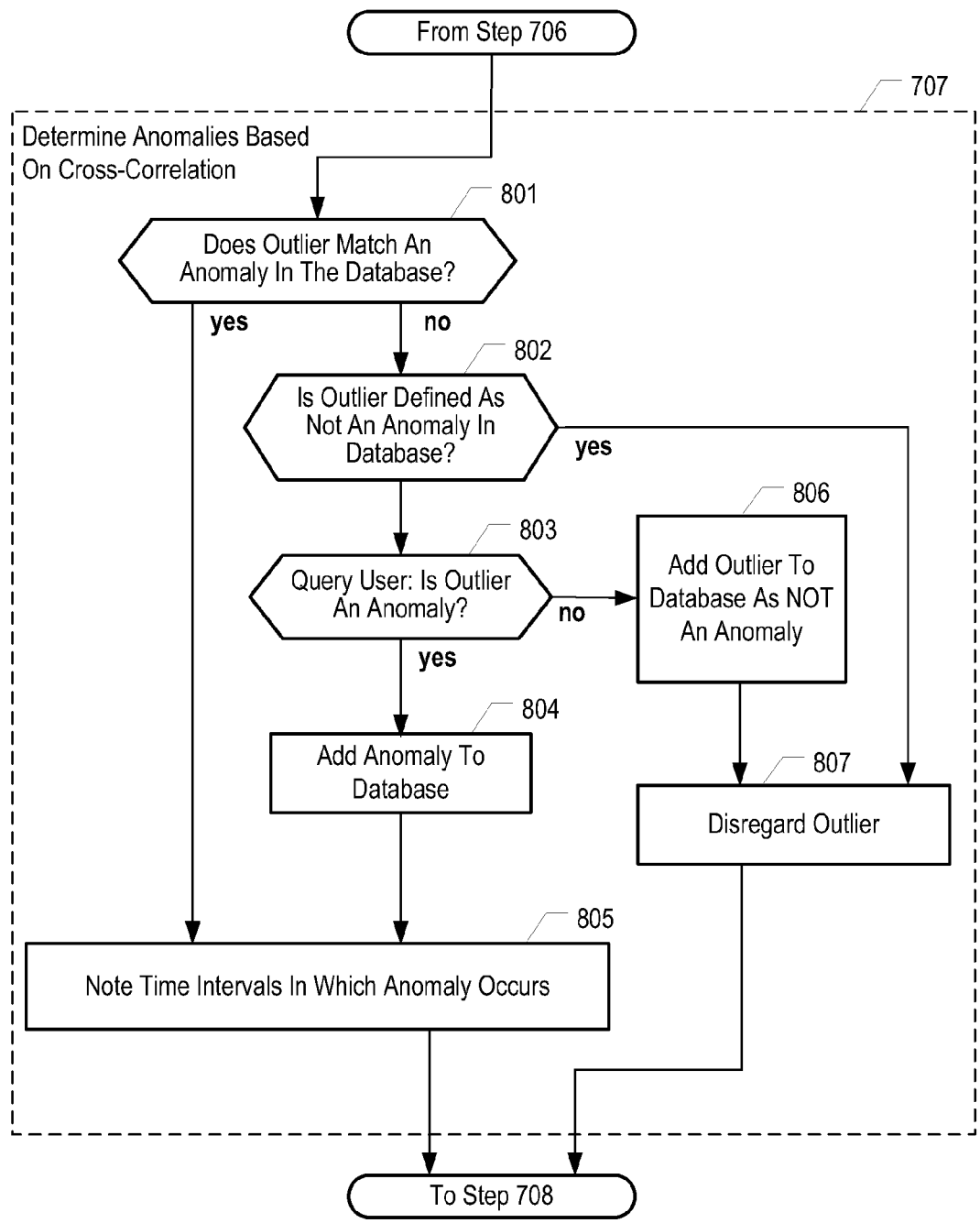
FIG. 8 depicts a flowchart of the salient tasks associated with task 707 in accordance with the illustrative embodiment of the present invention.

This task is described in greater detail in FIG. 8.

At task 708, system state is characterized based on the incidence of anomalies. In accordance with the illustrative embodiment of the present invention, a system in a "normal" state would have a regular distribution of anomalies. However, a spike in anomalous behavior at a certain time or place may indicate a problem in the system.

For example and without limitation, referring to FIG. 2, at a first time interval, there would be a particular time distribution of the messages that indicate dropped packets across link 202-1. However, referring to FIG. 3, should link 202-1 fail, there would be an increase in the cluster of messages that reflect that fact. In accordance with the illustrative embodiment of the present invention, anomalies around the region of link 202-1 would arise.

Anomalous behavior would be recognized around link 202-1, for example and without limitation, dropped packets, message failures, rerouting, etc. All these behaviors occur throughout the system, but the high incidence of the clusters of these messages around a particular location and time would result in anomalies. These anomalies are then used to determine the overall state of the system. In this illustrative example, the system recognizes a failed link.

It will be clear to one skilled in the art, after reading this disclosure, how to make and use alternative embodiments of the present invention that perform task 708.

It will be clear to one skilled in the art, after reading this disclosure how to make and use other implementations of the present invention in which one or more of the steps are omitted or are performed in a different order than the one presented or simultaneously.

FIG. 8 depicts a flowchart of the salient tasks associated with task 707 in accordance with the illustrative embodiment of the present invention.

At task 801, the cross-correlated outlier is checked against a database of known anomalies. If a cross-correlated outlier matches an anomaly entry in the database or list, then it is determined to be an anomaly. Although in accordance with the illustrative embodiment of the present invention the database lists both anomalies and outliers which are determined to not be anomalies, it will be clear to one skilled in the art, after reading this disclosure, how to make and use alternative embodiments of the present invention in which At task 802, the cross-correlated outlier is checked against a database of outliers that are known to not be anomalies. If the outlier is not an anomaly, then the system proceeds to task 807.

Although, in accordance with the illustrative embodiment of the present invention, the database of anomalies and the database of outliers known to not be anomalies are both part of a single database, it will be clear to one skilled in the art, after reading this disclosure, how to make and use alternative embodiments of the present invention in which these are two (2) distinct databases or any number of databases.

At task 803, if the cross-correlated outlier does not match any entries in the database, a user is presented with the cross-correlated outlier and asked whether it is an anomaly.

At task 804, if the cross-correlated outlier is an anomaly, it is then entered into the database of anomalies.

At task 805, the time intervals in which the anomaly occurs are noted.

At task 806, if outlier is not an anomaly, it is added to the database of outliers known to not be anomalies.

At task 807, if the cross-correlated outlier is not an anomaly, it is then disregarded.

It will be clear to one skilled in the art, after reading this disclosure, how to make and use other implementations of the present invention in which one or more of the steps are omitted or are performed in a different order than the one presented or simultaneously.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising compiling a first message log based, at least in part, on:
   (i) a second message log that comprises a first message A and a second message B,
   (ii) a dis-similarity distance $\Delta$ between the morphology of the first message A and the morphology of the second message B; and
   characterizing system state based on an incidence of anomalies indicated by the first message log,
   wherein the first message and the second message regard tracking of actions of at least one of communication nodes and communication links of a telecommunication system,
   wherein the first message and the second message are stored in a respective memory of the telecommunication system, and
   wherein the dis-similarity distance is based, at least in part, on:
   (i) a first dis-similarity distance $\Delta_1$ between a first sub-string of the first message $S_1(A)$ and a first sub-string of the second message $S_1(B)$,
   (ii) a second dis-similarity distance $\Delta_2$ between a second sub-string of the first message $S_2(A)$ and a second sub-string of the second message $S_2(B)$,
   (iii) a first weighting $W_1$ of the first dis-similarity distance $\Delta_2$, and
   (iv) a second weighting $W_2$ of the dis-similarity distance $\Delta_2$,
   wherein $\Delta=f(\Delta_1, W_1, \Delta_2, W_2)$.

2. The method of claim 1 wherein the dis-similarity distance is based on a first sub-string of the first message S(A) and a first sub-string of the second message S(B).

3. The method of claim 1 wherein the dis-similarity distance is increased when the first message and the second message have opposite meanings.

4. The method of claim 1 wherein the dis-similarity distance between the first message and the second message is based on the length of the first message and the length of the second message.

5. The method of claim 1 further comprising characterizing system state based on the occurrence of messages in the first message log with dis-similarity distance A below a threshold.

6. A method comprising compiling a first message log based on a clustering of messages in a second message log; and
   characterizing system state based on the occurrence of a first cluster in the first message log,
   wherein the clustering of messages is based, at least in part, on the dis-similarity distance of a plurality of messages, the plurality of messages comprising a first message A and a second message B,
   wherein the messages regard tracking of actions of at least one of communication nodes and communication links of a telecommunication system,
   wherein the messages are stored in a respective memory of the telecommunication system, and
   wherein the dis-similarity distance is based, at least in part, on:
   (i) a first dis-similarity distance $\Delta_1$ between a first sub-string of the first message $S_1(A)$ and a first sub-string of the second message $S_1(B)$,
   (ii) a second dis-similarity distance $\Delta_2$ between a second sub-string of the first message $S_2(A)$ and a second sub-string of the second message $S_2(B)$,
   (iii) a first weighting $W_1$ of the first dis-similarity distance $\Delta_2$, and
   (iv) a second weighting $W_2$ of the dis-similarity distance $\Delta_2$,
   wherein $\Delta=f(\Delta_1, W_1, \Delta_2, W_2)$.

7. The method of claim 6 wherein the clustering is based on a dis-similarity distance between a first message and a second message in the second message log.

8. The method of claim 7 wherein the dis-similarity distance is based on components in the first message and the second message.

9. The method of claim 7 wherein the weighting is based on the ordering of the components.

10. The method of claim 7 wherein the dis-similarity distance is increased when the first message and the second message have opposite meanings.

11. The method of claim 7 wherein the dis-similarity distance between the first message and the second message is based on the length of the first message and the length of the second message.

12. The method of claim 6 further comprising determining outliers in the clustering of messages.

13. The method of claim 12 further comprising cross-correlating outliers based on a second clustering of messages.

14. The method of claim 13 further comprising determining anomalies based on the cross-correlating.

15. The method of claim 14 further comprising characterizing system state based on the occurrence of anomalies.

16. A method comprising:
generating a first cluster of messages based on a dis-similarity distance between a first message A and a second message B in a first message log, and
characterizing system state based on the incidence of the first cluster of messages at a first time interval and the incidence of the cluster of messages at a second time interval,
wherein the first message and the second message regard tracking of actions of at least one of communication nodes and communication links of a telecommunication system,
wherein the first message and the second message are stored in a respective memory of the telecommunication system, and
wherein the dis-similarity distance is based, at least in part, on:
(i) a first dis-similarity distance $\Delta_1$ between a first sub-string of the first message $S_1(A)$ and a first sub-string of the second message $S_1(B)$,
(ii) a second dis-similarity distance $\Delta_2$ between a second sub-string of the first message $S_2(A)$ and a second sub-string of the second message $S_2(B)$,
(iii) a first weighting $W_1$ of the first dis-similarity distance $\Delta_2$, and
(iv) a second weighting $W2$ of the dis-similarity distance $\Delta_2$,
wherein $\Delta = f(\Delta_1, W_1, \Delta_2, W_2)$.

17. The method of claim 16 further comprising compiling a second message log based on the clustering of messages and the first message log.

18. The method of claim 16 wherein the dis-similarity distance is based on components in the first message and the second message.

19. The method of claim 18 wherein the dis-similarity distance is weighted based on the ordering of the components.

20. The method of claim 16 wherein the dis-similarity distance is increased when the first message and the second message have opposite meanings.

21. The method of claim 16 further comprising wherein characterizing system state is further based on a time series of the first cluster of messages and a time series of a second cluster of messages.

22. The method of claim 21 wherein characterizing system state is further based on a cross-correlation of outliers of the time series of the first cluster of messages and the time series of the second cluster of messages.

23. The method of claim 22 wherein the characterizing system state is further based on anomalies determined by the cross-correlation.

* * * * *